US012810097B2

(12) United States Patent
Kajiwara et al.

(10) Patent No.: US 12,810,097 B2
(45) Date of Patent: Nov. 24, 2026

(54) IMAGE PROCESSING APPARATUS, PRINTING APPARATUS, IMAGE PROCESSING METHOD, AND NON-TRANSITORY COMPUTER-READABLE STORAGE MEDIUM STORING COMPUTER PROGRAM

(71) Applicant: CANON KABUSHIKI KAISHA, Tokyo (JP)

(72) Inventors: Yuto Kajiwara, Kanagawa (JP); Yugo Mochizuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

(21) Appl. No.: 18/891,032

(22) Filed: Sep. 20, 2024

(65) Prior Publication Data

US 2025/0103839 A1 Mar. 27, 2025

(30) Foreign Application Priority Data

Sep. 21, 2023 (JP) ................................. 2023-156526

(51) Int. Cl.
*G06K 15/02* (2006.01)
*B41J 2/21* (2006.01)
*H04N 1/54* (2006.01)

(52) U.S. Cl.
CPC ......... *G06K 15/1823* (2013.01); *B41J 2/2117* (2013.01); *G06K 15/188* (2013.01); *G06K 15/1894* (2013.01); *G06K 2215/101* (2013.01); *H04N 1/54* (2013.01)

(58) Field of Classification Search
None
See application file for complete search history.

(56) References Cited

U.S. PATENT DOCUMENTS 8,424,992 B2 4/2013 Sano
8,873,103 B2 10/2014 Tsuchiya et al.
8,888,204 B2 * 11/2014 Iritani .................... B41J 2/2114 347/98

(Continued)

FOREIGN PATENT DOCUMENTS

CN 104774504 A 7/2015
CN 108025561 A 5/2018

(Continued)

OTHER PUBLICATIONS

Extended European Search Report dated Jan. 30, 2025, in European Patent Application No. 24200720.1.

(Continued)

*Primary Examiner* — Haris Sabah
(74) *Attorney, Agent, or Firm* — Venable LLP

(57) ABSTRACT

An image processing apparatus comprises an acquisition unit configured to acquire data of an image; and a generation unit configured to generate color separation data as data of a printing image including a first region and a second region based on the data of the image, wherein the generation unit generates the color separation data including first data for discharging, to the first region, first ink and a first reactive liquid that reacts with the first ink, and second data for discharging, to the second region, second ink and a second reactive liquid that has reactivity higher than reactivity of the first reactive liquid and reacts with the second ink.

13 Claims, 11 Drawing Sheets

(56) References Cited

U.S. PATENT DOCUMENTS

| | | | | |
|---|---|---|---|---|
| 9,162,706 | B2 | 10/2015 | Proia | |
| 9,262,705 | B2 | 2/2016 | Nakatani et al. | |
| 9,499,710 | B2 | 11/2016 | Okuda et al. | |
| 10,511,740 | B2 | 12/2019 | Oya | |
| 10,603,927 | B2 | 3/2020 | Okuda et al. | |
| 11,541,677 | B2 | 1/2023 | Hayamizu et al. | |
| 2005/0270351 | A1* | 12/2005 | Mouri | B41J 2/2117 347/103 |
| 2011/0267394 | A1* | 11/2011 | Ochiai | B41J 2/1433 347/15 |
| 2014/0320927 | A1* | 10/2014 | Kuo | H04N 1/54 358/2.1 |
| 2020/0101758 | A1 | 4/2020 | Okuda et al. | |
| 2023/0092169 | A1 | 3/2023 | Ishimi et al. | |
| 2024/0316950 | A1 | 9/2024 | Mochizuki et al. | |

FOREIGN PATENT DOCUMENTS

| | | | |
|---|---|---|---|
| JP | 2010-158888 | A | 7/2010 |
| JP | 2019-042982 | A | 3/2019 |
| JP | 6592869 | B1 | 10/2019 |

OTHER PUBLICATIONS

Office Action dated Jul. 27, 2026, in Chinese Patent Application No. 202411302528.4.

* cited by examiner

IMAGE PROCESSING APPARATUS, PRINTING APPARATUS, IMAGE PROCESSING METHOD, AND NON-TRANSITORY COMPUTER-READABLE STORAGE MEDIUM STORING COMPUTER PROGRAM

BACKGROUND OF THE INVENTION

Field of the Invention

The present invention relates to an image processing apparatus, a printing apparatus, an image processing method, and a non-transitory computer-readable storage medium storing a computer program.

Description of the Related Art

There is known a printing apparatus that prints an image on a print medium by applying a print material such as ink. In this printing apparatus, as a means for printing an image on a non-absorbable or poorly-absorbable print medium by applying ink containing a coloring material, there is known a method using a reactive liquid that reacts with the coloring material contained in the ink. This printing apparatus aggregates the coloring material contained in the ink by bringing the reactive liquid and the ink containing the coloring material into contact with each other on the print medium.

Japanese Patent Laid-Open No. 2019-42982 describes a printing method of forming an image by bringing non-white coloring material ink and white coloring material ink into contact with a reactive liquid on a print medium and aggregating a coloring material.

In the conventional technique, to obtain satisfactory color developability of coloring material ink, a reactive liquid that improves surface smoothness and reduces diffused components of reflected light is used. However, the surface smoothness may preferably be decreased depending on a status, and the conventional technique cannot control the surface smoothness using a reactive liquid.

SUMMARY OF THE INVENTION

To solve the above problem, the present invention makes it possible to control surface smoothness in accordance with ink.

According to one aspect of the present disclosure, there is provided an image processing apparatus comprising: an acquisition unit configured to acquire data of an image; and a generation unit configured to generate color separation data as data of a printing image including a first region and a second region based on the data of the image, wherein the generation unit generates the color separation data including first data for discharging, to the first region, first ink and a first reactive liquid that reacts with the first ink, and second data for discharging, to the second region, second ink and a second reactive liquid that has reactivity higher than reactivity of the first reactive liquid and reacts with the second ink.

According to another aspect of the present disclosure, there is provided a printing apparatus comprising: a print unit configured to print, on a print medium, first ink and second ink each containing a coloring material and a first reactive liquid and a second reactive liquid each containing no coloring material, wherein the first reactive liquid is printed in a region where the first ink is printed, and the second reactive liquid with reactivity higher than reactivity of the first reactive liquid is printed in a region where the second ink is printed.

According to another aspect of the present disclosure, there is provided an image processing method comprising: acquiring data of an image; and generating color separation data as data of a printing image including a first region and a second region based on the data of the image, wherein in the generating the color separation data, the color separation data including first data for discharging, to the first region, first ink and a first reactive liquid that reacts with the first ink, and second data for discharging, to the second region, second ink and a second reactive liquid that has reactivity higher than reactivity of the first reactive liquid and reacts with the second ink is generated.

According to another aspect of the present disclosure, there is provided a non-transitory computer-readable storage medium storing a computer program for causing, when loaded and executed by a computer, the computer to: acquire data of an image; and generate color separation data as data of a printing image including a first region and a second region based on the data of the image, wherein in the generating the color separation data, the color separation data including first data for discharging, to the first region, first ink and a first reactive liquid that reacts with the first ink, and second data for discharging, to the second region, second ink and a second reactive liquid that has reactivity higher than reactivity of the first reactive liquid and reacts with the second ink is generated.

Further features of the present invention will become apparent from the following description of exemplary embodiments (with reference to the attached drawings).

DESCRIPTION OF THE EMBODIMENTS

Figure 1:
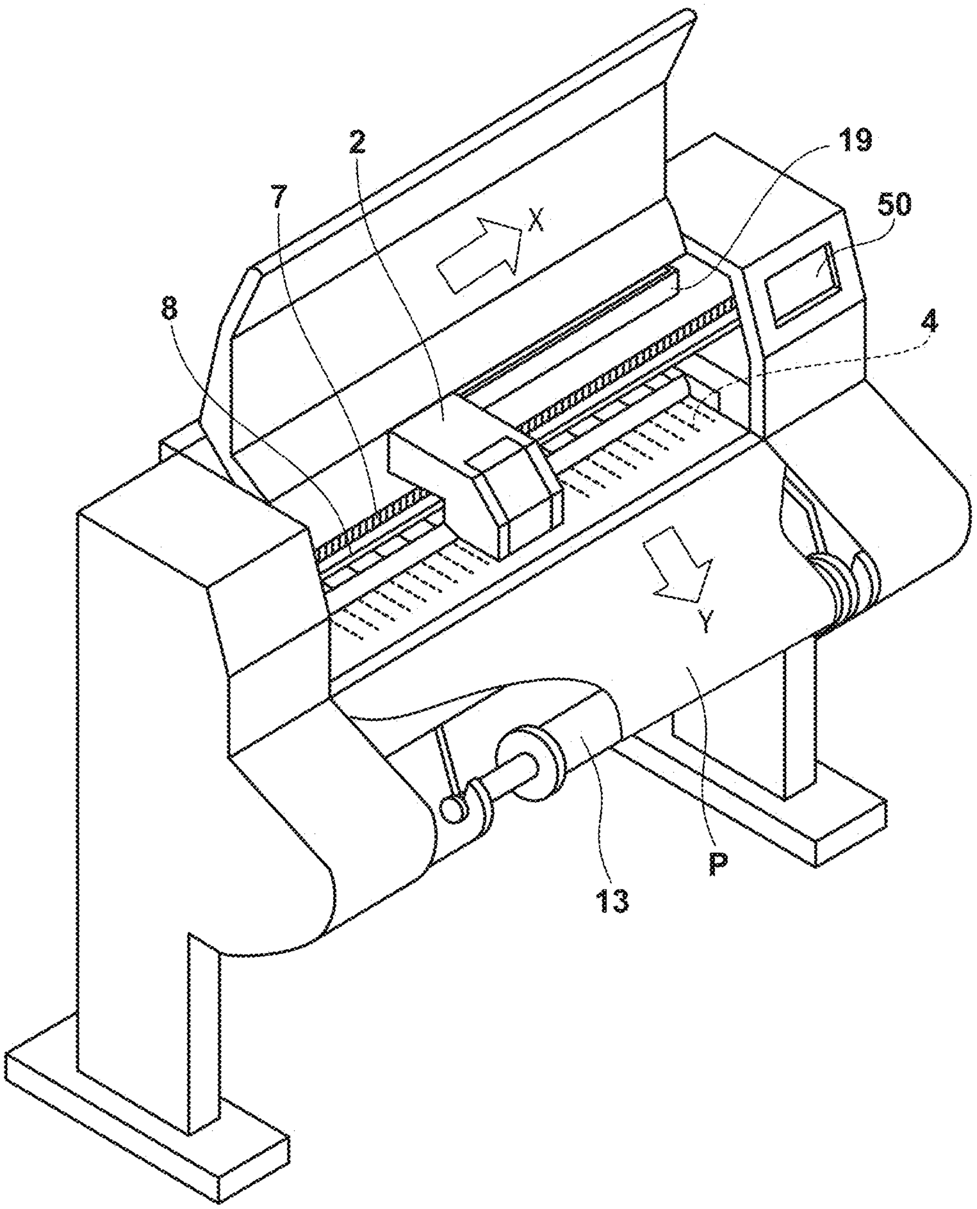
FIG. 1 is a perspective view of a printing apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

The first embodiment will be described below.

(Configuration of Inkjet Printing Apparatus)

FIG. 1 is a perspective view showing the outer appearance of an inkjet printing apparatus (to be also referred to as a printing apparatus hereinafter) according to this embodiment. The printing apparatus according to this embodiment is a so-called serial scan printing apparatus, and prints an image by scanning a printhead in a direction (X direction) intersecting a conveyance direction (Y direction) in which a print medium P is conveyed.

The configuration of the inkjet printing apparatus and an outline of a print operation according to this embodiment will be described. The print medium P is held in a spool. A conveyance roller is driven by a conveyance motor via a gear. This conveys the print medium P from the spool in the conveyance direction (Y direction).

A carriage unit 2 reciprocally scans (moves) at a predetermined conveyance position along a guide shaft 8 extending in the X direction by driving of a carriage motor (not shown). During the process of this scan, an ink droplet is discharged from an orifice provided in the printhead mounted on the carriage unit 2 at a timing based on a position signal obtained by an encoder 7, thereby printing an image on the print medium P. At this time, an image is printed in a region having a width (to be referred to as a band width hereinafter) corresponding to the array range of a plurality of orifices arrayed in the printhead. In this embodiment, a print resolution obtained when the carriage unit 2 scans at a speed of 40 inches/sec to discharge ink droplets is 1,200 dpi (dots/inch). Then, after the print medium P is conveyed, an image is printed in a next region having the band width by the next printing scan of the carriage unit 2.

Note that a driving force from the carriage motor to the carriage unit 2 is transferred by a carriage belt. Instead of the carriage belt, the driving force may be transferred by, for example, a configuration including a lead screw that extends in the X direction and is driven and rotated by the carriage motor, and an engaging portion provided in the carriage unit 2 to engage with a groove of the lead screw. A driving method is not particularly limited, and another driving method may be used.

The conveyed print medium P is nipped and conveyed by a paper feed roller and a pinch roller, and guided to a printing position on a platen 4. This printing position is the scan region of the printhead mounted on the carriage unit 2. In a pause state, the face surface of the printhead is normally capped. Therefore, when the cap is opened prior to a print operation, the printhead and the carriage unit 2 are set to be able to scan. When data corresponding to one printing scan is accumulated in a buffer, the carriage unit 2 is made to scan by driving of the carriage motor, thereby performing the above-described print operation.

A print element for discharging ink as a drop is provided inside each orifice of a printhead 9. A flexible wiring board 19 is provided to supply a driving pulse, a head temperature adjustment signal, and the like for driving the print element. The other terminal of the flexible board is connected to a control unit (not shown) including a control circuit such as a CPU for controlling the printing apparatus.

A UI screen 50 displays an instruction to stop a print operation, information of the print medium P, and the like so that a user can input and confirm them.

Figure 2:
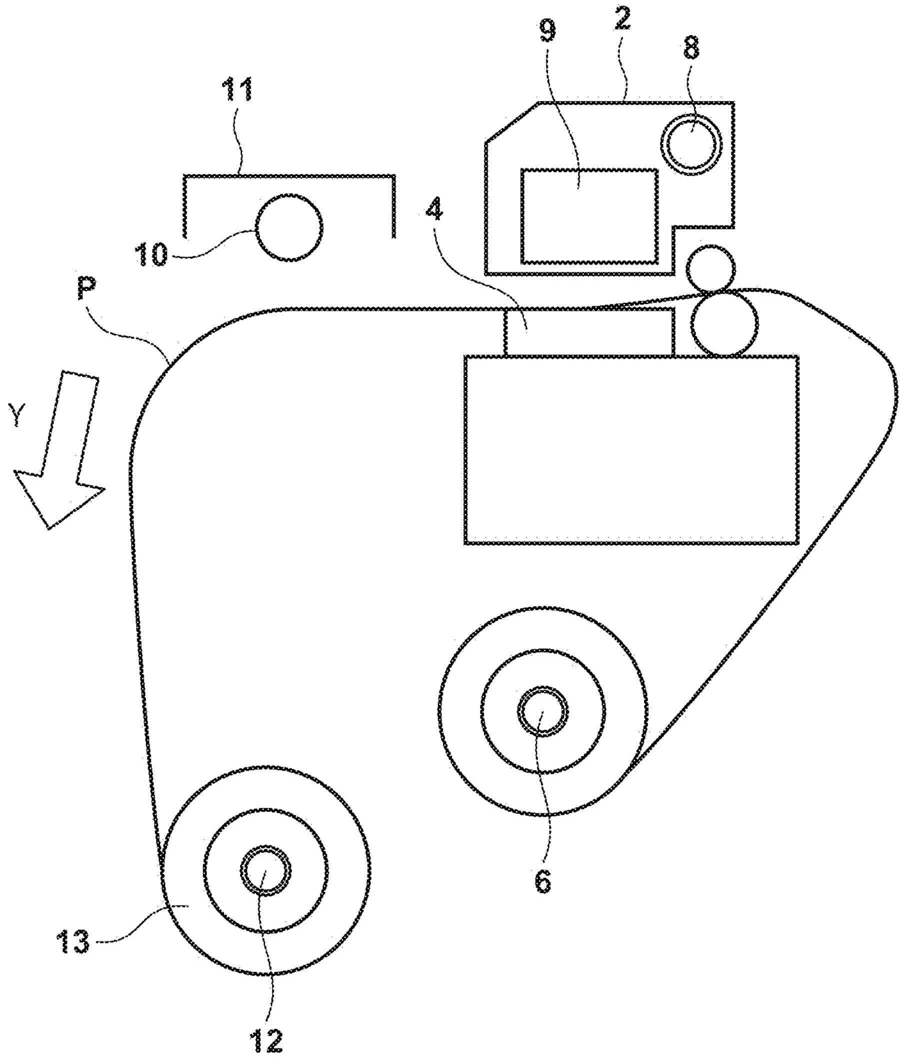
FIG. 2 is a schematic side view of the main body of the printing apparatus according to the first embodiment.

FIG. 2 is a schematic side view of the main body of the printing apparatus. A heater 10 supported by a frame (not shown) is arranged in a curing region located on the downstream side, in the conveyance direction (Y direction in FIG. 2), of a position at which the printhead 9 attached to the carriage unit 2 reciprocally scans. Heat from the heater 10 dries liquid ink applied onto the print medium P. The heater 10 is covered with a heater cover 11. The heater cover 11 performs a function of efficiently applying heat of the heater 10 onto the print medium P and a function of protecting the heater 10. The heater 10 is, for example, a sheathed heater or a halogen heater. The heating temperature of a heating portion in the curing region may be set in consideration of the film formability and productivity of water-soluble resin microparticles, and the heat resistance of the print medium P. Note that the heater of the heating portion in the curing region may perform hot air blast heating from above, contact-type heat-conductive heater heating from below the print medium, or the like. In this embodiment, one heater of the heating portion in the curing region is provided. Note that two or more heaters can be provided and used together as long as a temperature measured by a radiation thermometer (not shown) does not exceed the set value of the heating temperature on the print medium P. After the print medium P is conveyed from a spool 6 in the conveyance direction, and an image is printed on the print medium P by applying ink from the printhead 9, the print medium P is taken up by a take-up spool 12 and forms a roll-like taken-up medium 13.

(Configuration of Printhead)

Figure 3:
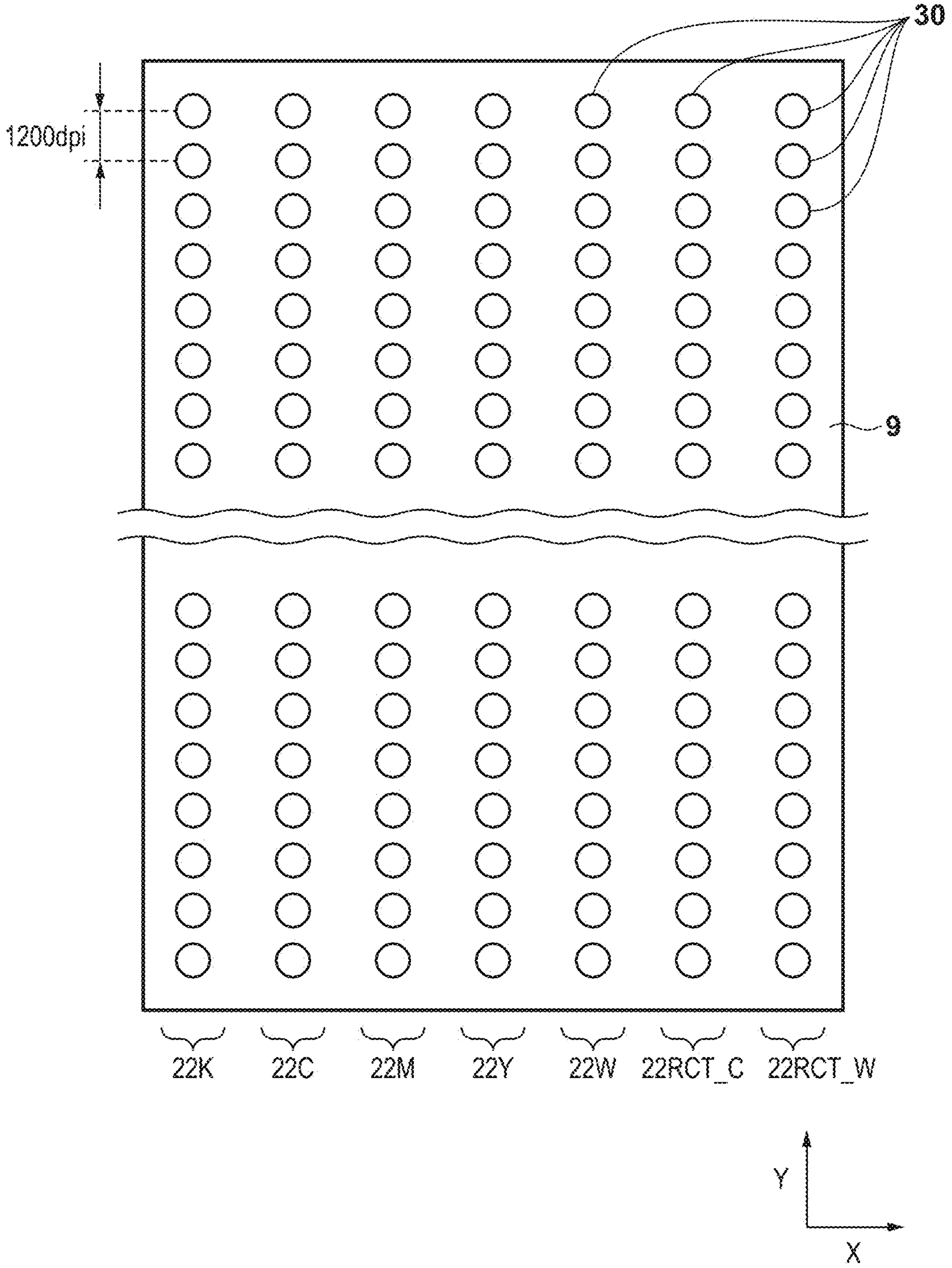
FIG. 3 is a schematic view of a printhead according to the first embodiment.

FIG. 3 is a schematic view of the printhead according to this embodiment. The printhead 9 includes a plurality of orifice arrays for discharging inks each containing a coloring material and reactive liquids each containing no coloring material, in each of which a plurality of orifices are arrayed. The printhead 9 of this embodiment includes an orifice array 22K for discharging black ink (K), an orifice array 22C for discharging cyan ink (C), an orifice array 22M for discharging magenta ink (M), an orifice array 22Y for discharging yellow ink (Y), and an orifice array 22W for discharging white ink (W). Each of the black ink (K), cyan ink (C), magenta ink (M), yellow ink (Y), and white ink (W) contains a coloring material. For the sake of descriptive simplicity, these inks will also be referred to as coloring material inks hereinafter. The coloring material inks except for the white ink will also be referred to as color inks hereinafter. Each color ink is an example of color development ink. The white ink is an example of concealing ink.

The printhead 9 of this embodiment includes an orifice array 22RCT_C for discharging a reactive liquid (RCT_C) and an orifice array 22RCT_W for discharging a reactive liquid (RCT_W) with reactivity higher than that of the reactive liquid (RCT_C). Each of the two reactive liquids with different reactivities contains a reactive component that reacts with the coloring material contained in the coloring material ink. When the coloring material ink and the reactive liquid contact each other on the print medium, the component of the reactive liquid aggregates the coloring material in the coloring material ink. This aggregation fixes the coloring material onto the print medium. The reactive liquid according to this embodiment contains no coloring material.

As shown in FIG. 3, in the printhead 9, the orifice arrays 22K, 22C, 22M, 22Y, 22W, 22RCT_C, and 22RCT_W are arranged in this order. In each of the orifice arrays 22K, 22C, 22M, 22Y, 22W, 22RCT_C, and 22RCT_W, 1,280 orifices 30 for discharging the corresponding ink are arrayed in the Y direction (array direction) at a density of 1,200 dpi. Note that in this embodiment, the amount of ink discharged from one orifice 30 at a time is, for example, about 4.5 pl.

Each of these orifice arrays is connected to an ink tank (not shown) storing the corresponding ink, and is supplied with the ink from the ink tank. The printhead 9 and the ink tanks may be formed integrally or separately. The detailed compositions of the coloring material inks (C, M, Y, K, and W) and the reactive liquids (RCT_C and RCT_W) will be described later.

Water-soluble resin microparticles that form a film by heating and improve abrasion resistance of a printed product may be contained in each coloring material ink. As ink different from the coloring material inks and the reactive liquids, clear emulsion ink (Em) containing not a coloring material but water-soluble resin microparticles may be dischargeable. In this case, the printhead 9 includes an orifice array in which orifices for discharging the clear emulsion ink are arrayed.

(Compositions of Inks)

Details of each ink forming an ink set according to this embodiment will be described next. "Parts" and "%" are on a mass basis unless otherwise specified.

Each of the coloring material inks (C, M, Y, K, and W) and the reactive liquids (RCT_C and RCT_W) used in this embodiment contains a water-soluble organic solvent. The water-soluble organic solvent preferably has a boiling point of 150° C. (inclusive) to 300° C. (inclusive) for the reasons of the wettability and the moisture retaining property of the face surface of the printhead 9. From the viewpoint of the function of a film formation assistant with respect to the resin microparticles and the swelling-solubility property in the print medium in which a resin layer is formed, solvents may be ketone-based compounds such as acetone and cyclohexane, propylene glycol derivatives such as tetraethylene glycol dimethyl ether, and heterocyclic compounds having a lactam structure such as N-methyl-pyrrolidone and 2-pyrrolidone. From the viewpoint of the discharge performance, the content of the water-soluble organic solvent is preferably 3 wt % (inclusive) to 30 wt % (inclusive).

More specifically, examples of the water-soluble organic solvent are alkyl alcohols having 1 to 4 carbon atoms such as methyl alcohol, ethyl alcohol, n-propyl alcohol, isopropyl alcohol, n-butyl alcohol, sec-butyl alcohol, and tert-butyl alcohol. The water-soluble organic solvent may be amides such as dimethylformamide and dimethylacetamide. The water-soluble organic solvent may be ketones or keto alcohols such as acetone and diacetone alcohol. The water-soluble organic solvent may be ethers such as tetrahydrofuran and dioxane. The water-soluble organic solvent may be polyalkylene glycols such as polyethylene glycol and polypropylene glycol. The water-soluble organic solvent may be ethylene glycol. The water-soluble organic solvent may be alkylene glycols in which an alkylene group contains 2 to 6 carbon atoms, such as propylene glycol, butylene glycol, triethylene glycol, 1,2,6-hexane triol, thiodiglycol, hexylene glycol, and diethylene glycol. The water-soluble organic solvent may be lower alkyl ether acetate such as polyethylene glycol monomethyl ether acetate. The water-soluble organic solvent may be glycerin. The water-soluble organic solvent may be lower alkyl ethers of polyhydric alcohol such as ethylene glycol monomethyl (or ethyl) ether, diethylene glycol methyl (or ethyl) ether, and triethylene glycol monomethyl (or ethyl) ether. The water-soluble organic solvent may be polyhydric alcohol such as trimethylol propane and trimethylol ethane. Examples of the water-soluble organic solvent are N-methyl-2-pyrrolidone, 2-pyrrolidone, and 1,3-dimethyl-2-imidazolidinon. The water-soluble organic solvents as described above can be used singly or in the form of a mixture. It is desirable to use deionized water as water. Note that the content of the water-soluble organic solvent in each reactive liquid (RCT_C or RCT_W) is not particularly limited. To give desired physical property values to the coloring material inks (C, M, Y, K, and W) as needed, it is possible to properly add a surfactant, an antifoaming agent, an antiseptic agent, and an anti-mold agent in addition to the abovementioned components.

The coloring material inks (C, M, Y, K, and W) and the reactive liquids (RCT_C and RCT_W) used in this embodiment can contain a surfactant. The surfactant is used as a penetrant for the purpose of improving the penetration property of ink to an inkjet print medium. As the addition amount of the surfactant increases, a property that decreases the surface tension of ink increases, so the wettability and penetration property of ink with respect to the print medium are improved. In this embodiment, by adding a small amount of an acetylene glycol EO adduct as the surfactant, adjustment is performed such that the surface tension of each ink is 30 dyn/cm or less and the surface tension difference between inks is 2 dyn/cm or less. More specifically, the surface tension of each ink can uniformly be adjusted to about 22 to 24 dyn/cm. The surface tension was measured by using the fully automatic surface tensiometer CBVP-Z (manufactured by Kyowa Interface Science). Note that the measurement device is not limited to the above example as long as the surface tension of ink can be measured.

The pH of each ink of this embodiment is stable on the alkali side, and the value is 8.5 to 9.5. The pH of each ink is preferably 7.0 (inclusive) to 10.0 (inclusive) in order to prevent elution and deterioration of a member that comes in contact with each ink in the printhead or the printing apparatus and/or to prevent a decrease in solubility of a dispersion resin in ink. The pH was measured by using the pH METER F-52 manufactured by HORIBA. Note that the measurement device is not limited to the above example as long as the pH of ink can be measured.

The coloring material inks may further include light cyan ink (Lc), light magenta ink (Lm), gray ink (Gy), red ink (R), orange ink (Or), green ink (G), and violet ink (V).

(Water-Soluble Resin Microparticles)

Each coloring material ink used in this embodiment contains water-soluble resin microparticles. "Water-soluble resin microparticles" are polymer microparticles that exist in a state in which they are dispersed in water. More specifically, examples of water-soluble resin microparticles are acrylic resin microparticles synthesized by emulsion polymerization of monomers such as alkyl ester (meth)acrylate or alkyl amide (meth)acrylate, styrene-acrylic resin microparticles synthesized by emulsion polymerization of monomers such as alkyl ester (meth)acrylate or alkyl amide (meth) acrylate and styrene, polyethylene resin microparticles, polypropylene resin microparticles, polyurethane resin microparticles, or styrene-butadiene resin microparticles. It is also possible to use, as water-soluble resin microparticles, core-shell resin microparticles in which a core portion and a shell portion forming the resin microparticle have different polymer compositions, or resin microparticles obtained by performing emulsion polymerization around acryl-based microparticles, as seed particles, previously synthesized in order to control the particle size. Furthermore, it is possible to use, as water-soluble resin microparticles, hybrid resin microparticles obtained by chemically bonding different resin microparticles such as acrylic resin microparticles and urethane resin microparticles. Note that water-soluble resin microparticles need not always be contained in the coloring material ink and may be contained in clear emulsion ink.

(Reactive Liquid)

As described above, each reactive liquid contains reactive components for insolubilizing some or all of solid components of the coloring material ink in order to fix the coloring material onto the print medium. Each reactive liquid has a purpose of insolubilizing a dye dissolved in the coloring material ink or a dispersed pigment and resins. Each reactive liquid may be, for example, a solution (for example, magnesium nitrate, magnesium chloride, aluminum sulfate, iron chloride, or the like) containing multivalent metal ions. As a kind of aggregation effect using cation, a system using a low molecular weight cationic polymer flocculant for the purpose of charge neutralization of water-soluble resin microparticles and insolubilization of an anionic soluble substance can also be used as a reactive liquid.

As another reaction system, there is an insolubilization system by a reactive liquid using a difference in pH. As described above, most of coloring material inks used for inkjet printing are generally stable on the alkali side due to properties such as the properties of the coloring materials. The pH of each coloring material ink is generally about 7 to 10. The pH of each coloring material ink is often mainly set to about 8.5 to 9.5 from the industrial viewpoint or in consideration of the influence of an external environment and the like. To aggregate/solidify the coloring material ink of the reaction system, an acid solution is entered to change the pH and destroy the stable state, thereby making it possible to aggregate the dispersed components. The reactive liquid may be a solution presenting acidity for the purpose of this effect.

In this embodiment, when fixing the coloring materials onto the print medium, a plurality of reactive liquids with different reactivities are used for the purpose of changing the surface smoothness. As described above, it is possible to make the reactivity of each reactive liquid different by changing the concentration of a solution containing multivalent metal ions or the value of the pH. For example, it is possible to make the reactivity different by setting the concentration of the solution containing multivalent metal ions to 2% to 4% for a reactive liquid with low reactivity and 6% to 8% for a reactive liquid with high reactivity.

(Print Medium)

The printing apparatus according to this embodiment prints on a low-permeability print medium into which water hardly permeates. The low-permeability print medium indicates a medium that does not absorb water at all or has an extremely small amount of water absorption, as described above. Therefore, aqueous ink containing no organic solvent is repelled by the print medium, thereby making it impossible to form an image. On the other hand, the low-permeability print medium is excellent in water resistance and weatherability, and is thus suitable as a medium on which a printed product to be used outdoors is formed. A print medium having a contact angle of water of 45° (inclusive) or more, for example, 60° (inclusive) or more at 25° C. is normally used.

Examples of the low-permeability print medium are a print medium in which a plastic layer is formed on the outermost surface of a base material, a print medium in which no ink absorbing layer is formed on a base material, and a sheet, a film, and a banner of glass, YUPO, plastic, or the like. Examples of the abovementioned applied plastic are polyvinyl chloride, polyethylene terephthalate, polycarbonate, polystyrene, polyurethane, polyethylene, and polypropylene. These low-permeability print media are excellent in water resistance, light resistance, and abrasion resistance. Therefore, the low-permeability print media are generally used to print a printed product for outdoor exhibition.

As an example of a method of evaluating the permeability of the print medium, the Bristow procedure described in JAPAN TAPPI Paper Pulp Test Method No. 51, "Test Method for Liquid Absorbency of Paper and Paperboard" can be used. The Bristow procedure is a method of injecting a predetermined amount of ink into a holding vessel having an opening slit with a predetermined size, bringing the ink into contact with a print medium formed into a strip and wound on a circular disk via the slit, rotating the circular disk while fixing the position of the holding vessel, and measuring the area (length) of an ink belt transferred to the print medium. A transfer amount ($ml/m^{-2}$) per unit area for 1 sec can be calculated from the area of the ink belt. In this embodiment, a print medium whose transfer amount of ink (an amount of water absorption) for 30 $msec^{1/2}$ by the above-described Bristow procedure is smaller than 10 $ml \cdot m^{-2}$ is considered as a low-permeability print medium.

(Concealability and Surface Smoothness)

As described above, in this embodiment, white ink is used as one of the coloring material inks for a purpose different from that of the remaining color inks, that is, for a purpose of not color development but concealment. Thus, in this embodiment, it is possible to conceal a background side not to be seen through the print medium by using the white ink for a print medium having high transparency.

Figure 4A:
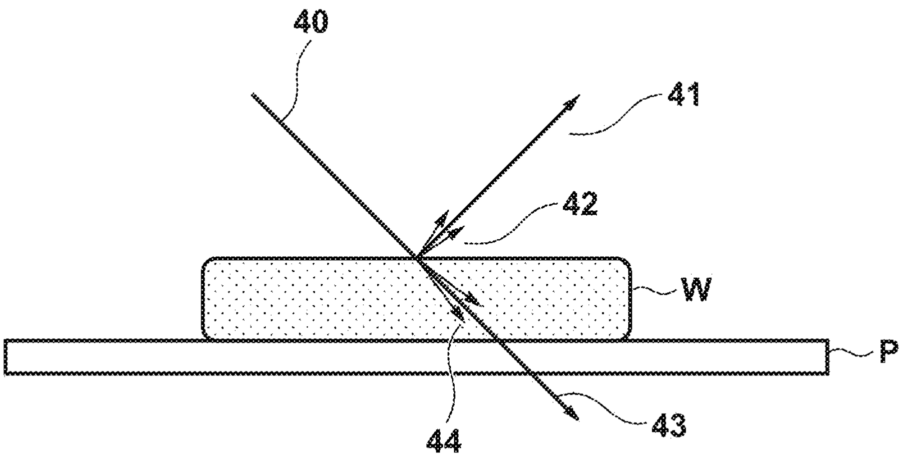
FIG. 4A is a view showing reflection and transmission of light in a case where the surface smoothness of white ink is high on a print medium.
Figure 4B:
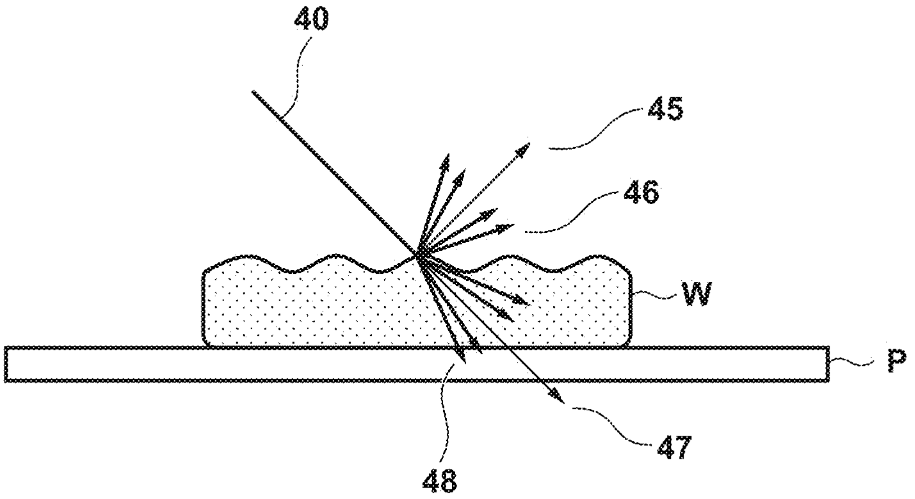
FIG. 4B is a view showing reflection and transmission of light in a case where the surface smoothness of the white ink is low on the print medium.

To improve concealability, it is important to decrease an amount of transmitted light by increasing the amount of white ink on the print medium and not to form an image by decreasing the surface smoothness of the white ink on the print medium to diffuse the transmitted light. FIG. 4A is a view showing reflection and transmission of light in a case where the surface smoothness of the white ink W is high on the print medium P. In a case where the surface smoothness of the white ink W is high, an amount of specular reflected light 41 is large and an amount of diffuse reflected light 42 is small with respect to incident light 40. Similarly, with respect to transmission, an amount of specular transmitted light 43 is large and an amount of diffuse transmitted light 44 is small. When an amount of diffused components decreases, an image is formed, and thus concealability is lower as the surface smoothness is higher. FIG. 4B is a view showing reflection and transmission of light in a case where the surface smoothness of the white ink W is low on the print medium P. In a case where the surface smoothness of the white ink W is low, an amount of specular reflected light 45 is small and an amount of diffuse reflected light 46 is large with respect to the incident light 40. Similarly, with respect to transmission, an amount of specular transmitted light 47 is small and an amount of diffuse transmitted light 48 is large. When an amount of diffused components increases, an image is hardly formed, and thus concealability is higher as the surface smoothness is lower.

Conventionally, to improve concealability, control is executed to decrease the amount of transmitted light by making the amount of the white ink larger than the amount of the color inks on the print medium. However, in a printing method of aggregating the coloring material contained in the coloring material ink by bringing the coloring material ink into contact with the reactive liquid on the print medium, the surface smoothness is decided by aggregability. Therefore, control to improve concealability by diffusing transmitted light is not executed.

By using a reactive liquid with low reactivity, it takes relatively long time to aggregate the dispersed coloring material and fix it onto the print medium. Thus, the coloring material sufficiently is wet and spreads on the print medium, thereby making it possible to implement high surface smoothness. On the other hand, by using a reactive liquid with high reactivity, the dispersed coloring material is aggregated and fixed onto the print medium without taking relatively long time. Thus, the coloring material is neither sufficiently wet nor spreads on the print medium, thereby making it possible to implement low surface smoothness. Note that the surface smoothness can be obtained by performing three-dimensional roughness measurement using a non-contact optical interferometer (product name: VertScan R5500G by Ryoka Systems Inc.).

Conventionally, a reactive liquid with low reactivity that implements a state in which an amount of diffuse reflected light is small and the surface smoothness is high in order to improve the color development of color ink is also used for the white ink. This unwantedly increases the surface smoothness of the white ink, similar to the color ink.

In this embodiment, a plurality of reactive liquids with different reactivities are used. More specifically, in this embodiment, a reactive liquid with low reactivity is used for the color ink for the purpose of color development and a reactive liquid with high reactivity is used for the white ink for the purpose of concealment. Therefore, in this embodiment, it is possible to print an excellent image with respect to the color development of color and concealment of white.

(Configuration of Printing System)

Figure 5:
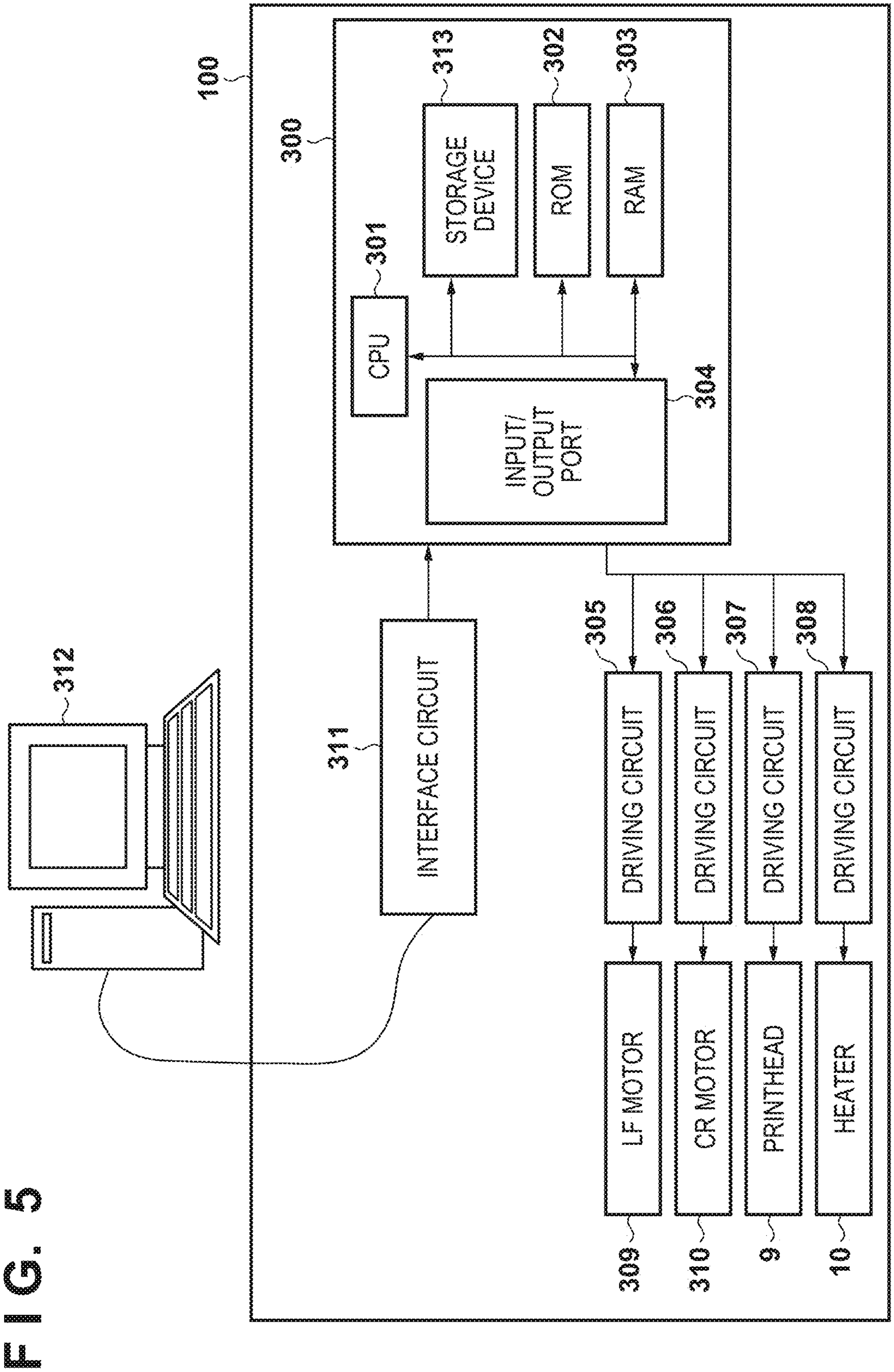
FIG. 5 is a block diagram showing the control system of the printing apparatus according to the first embodiment.

FIG. 5 is a block diagram showing a control system in a printing apparatus 100 according to this embodiment. The printing apparatus 100 includes a main control unit 300, a conveyance motor (LF motor) 309, a carriage motor (CR motor) 310, the printhead 9, the heater 10, driving circuits 305, 306, 307, and 308, and an interface circuit 311. The main control unit 300 includes a CPU 301, a ROM 302, a RAM 303, an input/output port 304, and a storage device 313.

The CPU 301 executes processing operations such as arithmetic operations, selection, discrimination, and control, and a print operation. The ROM 302 stores control programs and the like to be executed by the CPU 301. The RAM 303 is used as a print data buffer or the like.

The storage device 313 is a mass storage device such as a Hard Disk Drive (HDD) or a Solid State Drive (SSD). The storage device 313 stores programs to be executed by the CPU 301, mask patterns, and the like (to be described later). The input/output port 304 is connected to the driving circuits 305, 306, 307, and 308 for the conveyance motor 309, the carriage motor 310, the printhead 9, and the heater 10. In addition, the main control unit 300 is connected to a host apparatus 312 via the interface circuit 311. The host apparatus 312 is, for example, a personal computer.

(Image Processing Procedure)

Figure 6:
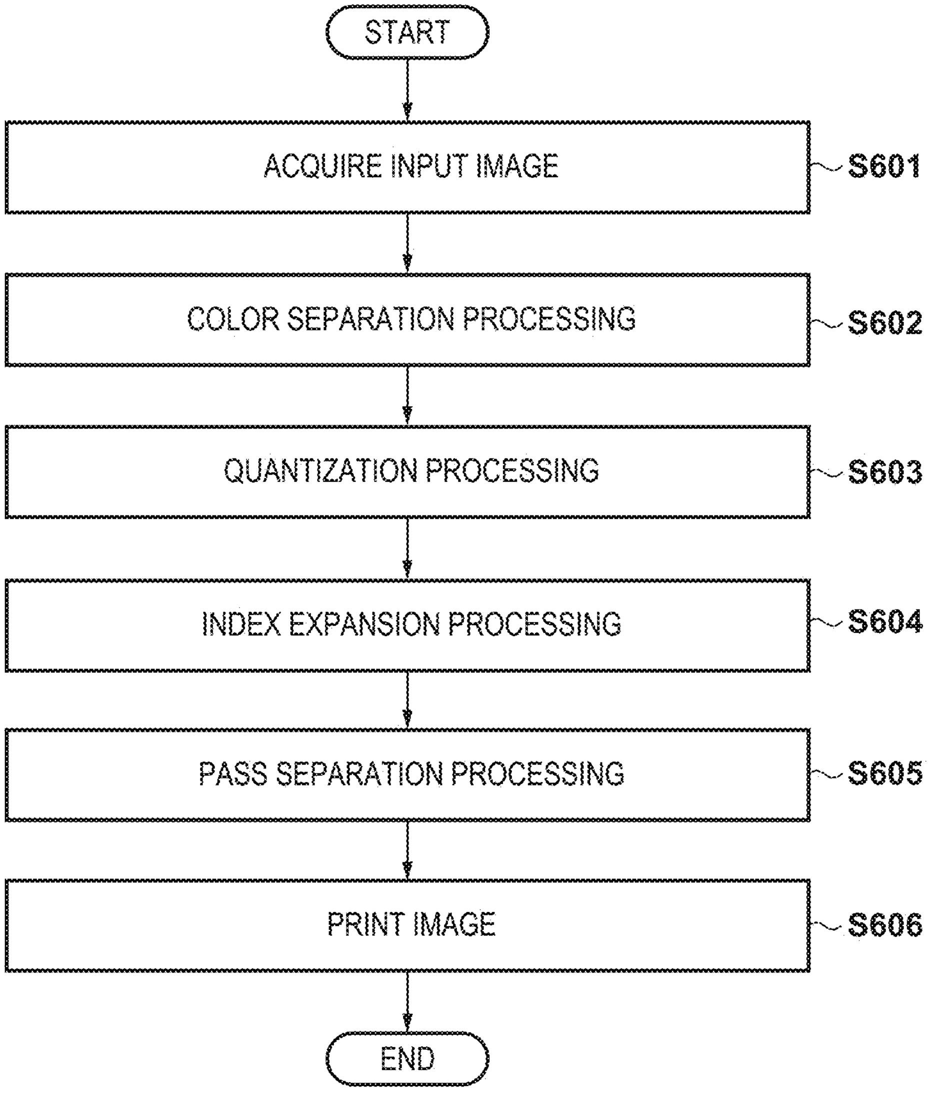
FIG. 6 is a flowchart for explaining image processing according to the first embodiment.

FIG. 6 is a flowchart for explaining image processing for executing single-layer printing in which the color inks and the white ink are printed in exclusive regions. Processing of generating, from input image data, discharge data for image printing in the printing apparatus will be described below with reference to FIGS. 5 and 6. This processing is executed when one of the host apparatus 312 and the printing apparatus 100 functions as an image processing apparatus. Note that the host apparatus 312 and the printing apparatus 100 may share and execute part of this processing.

The host apparatus 312 includes an application (not shown), and a printer driver (not shown) for the printing apparatus 100. Based on information input by the user on the UI screen of the host apparatus 312, the application executes processing of creating print image data to be transmitted to the printer driver and processing of setting print control information for managing control of printing.

The application sends the processed print image data and print control information to the printer driver at the time of printing. Then, the host apparatus 312 on which the printer driver is installed transfers the print image data to the printing apparatus 100 via the interface circuit 311. The main control unit 300 of the printing apparatus 100 performs image processing for the transferred print image data.

The following program is stored in the storage device 313 incorporated in the main control unit 300 of the printing apparatus 100, and is deployed into the RAM 303 and executed by the CPU 301.

In step S601 shown in FIG. 6, the CPU 301 acquires data of an input image, and stores it in the storage device 313 or the like. The input image is desirably an RGB+W image, a CMYK+W image, or the like obtained by adding an image (W image) for white representing a concealed region to an image in a general format such as an RGB image or a CMYK image representing a color development region. Alternatively, the CPU 301 may acquire, as an input image, an image in a general format such as an RGB image or a CMYK image representing a color development region. In this case, the CPU 301 may generate, from the input image, an image including a concealed region by converting signal values (R, G, B)=(255, 255, 255) or (C, M, Y, K)=(0, 0, 0, 0) representing a white region into the concealed region, and store the image as a new input image.

In step S602, the CPU 301 executes, for the input image including the concealed region acquired in step S601, color separation processing for generating color separation data as data of a printing image including multi-valued data of the respective inks and the respective reactive liquids. More specifically, the CPU 301 generates, from data representing the color development region of the input image, multi-valued data of the coloring material inks (C, M, Y, and K) to be used for printing and multi-valued data of the reactive liquid (RCT_C). The CPU 301 generates, from data representing the concealed region of the input image, multi-valued data of the coloring material ink (W) to be used for printing and multi-valued data of the reactive liquid (RCT_W). As a method of converting the signal values of the input image, a known method such as a method of referring to a lookup table (LUT) stored in advance in the ROM 302 or the like may be adopted. The CPU 301 mainly uses the white ink for printing for the concealed region of the input image but may execute color separation processing of applying another color ink for the purpose of adjusting white. In a case where another color ink is used for printing for the concealed region, a reactive liquid to be printed is the same reactive liquid (RCT_W) as for the white ink. Even for the same color ink, the reactive liquids (RCT_C and RCT_W) are selectively used in accordance with the color development region or the concealed region. When performing color separation processing, the balance between the amount of the coloring material ink and the amount of the reactive liquid is important. If the amount of the reactive liquid is small with respect to the coloring material ink, the coloring material is not sufficiently aggregated, thereby causing beading. If the amount of the reactive liquid is large with respect to the coloring material ink, a moisture content in the reactive liquid increases, thereby causing beading. Therefore, in the color separation processing, the CPU 301 desirably balances an appropriate ink amount with each of the color development region and the concealed region of the image in order to implement excellent image formation.

In step S603, the CPU 301 executes quantization processing of converting each of the multi-valued data of the coloring material inks and the multi-valued data of the reactive liquids after the color separation processing into quantization data of several bits. When, for example, quantizing the multi-valued data into 4-valued data, the CPU 301 converts tone data into 2-bit data of levels 0 to 3. As the method of the quantization processing, there are known the error diffusion method and the dither method, but any method may be used.

In step S604, the CPU 301 executes index expansion processing based on the quantized data of the coloring material inks and the quantized data of the reactive liquids. More specifically, the CPU 301 selects, in association with the level obtained in step S603, one dot arrangement pattern from a plurality of dot arrangement patterns for defining the number of dots to be printed in each pixel. At this time, as the form of the dot arrangement pattern, the number of dots to be printed in a region corresponding to each pixel is desirably made different depending on the level value. To improve the surface smoothness of the color ink among the coloring material inks, the CPU 301 sets the number of dots of the color ink to 0, 1, 2, or 3 to minimize a difference in number of dots between the levels. On the other hand, the CPU 301 sets the number of dots of the white ink to 0, 2, 4, or 6 to intentionally increase a difference in number of dots between the levels. Thus, when printing a uniform density on the print medium, 4 dots or 6 dots are printed in a region corresponding to each pixel, thereby making it possible to execute printing that decreases the surface smoothness by increasing a difference in number of dots.

Figure 7:
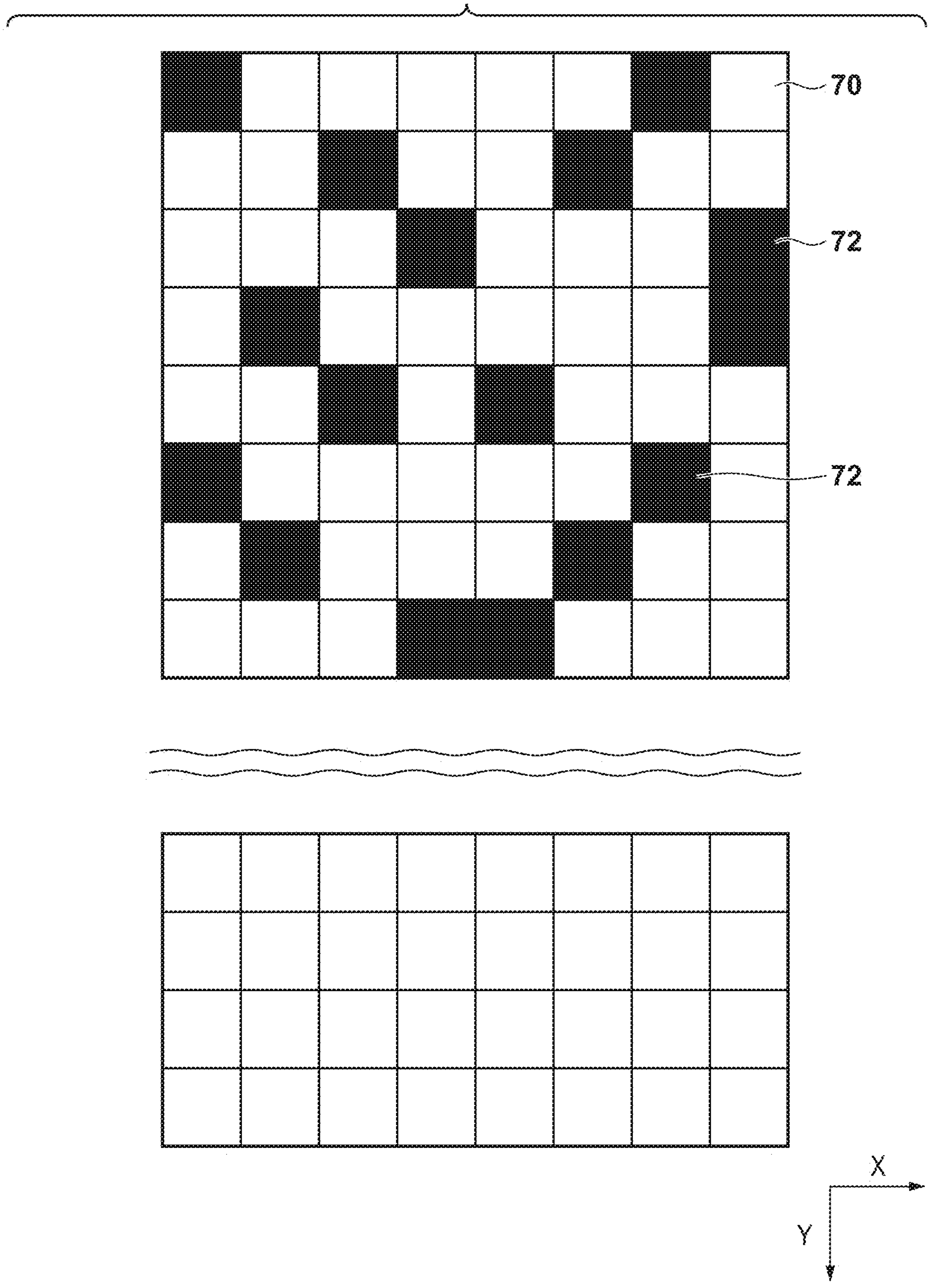
FIG. 7 is a view showing an example of a pass mask according to the first embodiment.

In step S605, the CPU 301 performs pass separation processing of assigning, to the coloring material ink data and the reactive liquid data as the dot data obtained by performing the index expansion processing, orifices to be used for printing, by a pass mask. FIG. 7 is a view showing an example of the pass mask used to perform the pass separation processing of the color ink and the reactive liquid corresponding to the color ink. Among a plurality of squares 70, black squares 72 are the squares 72 for performing discharge, the square 70 in the X direction indicates the coordinates of a region corresponding to a pixel for which printing is executed, and the square 70 in the Y direction corresponds to each orifice of an orifice array. For example, there are 1,280 squares 70 in total. For the purpose of restricting orifices used for printing, the pass mask indicates that lower 640 squares 70 of the 1,280 squares 70 in the Y direction do not perform discharge. In this embodiment, the CPU 301 sets no squares 70, that do not perform discharge, in the orifice arrays for the white ink and the reactive liquid corresponding to the white ink.

Figure 8:
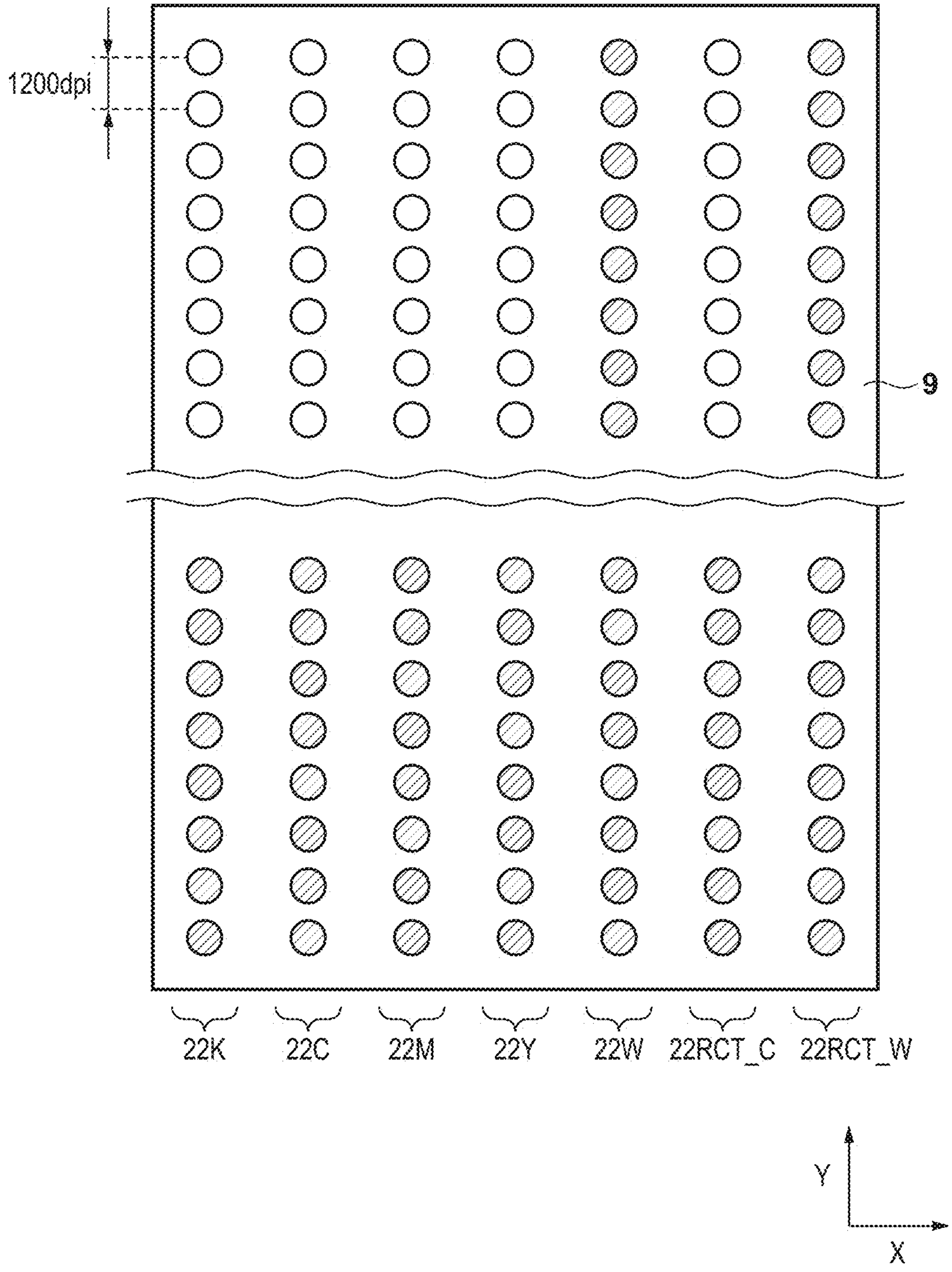
FIG. 8 is a view of the printhead in which an orifice that performs discharge after pass separation processing is hatched according to the first embodiment.

FIG. 8 is a view of the printhead in which an orifice that performs discharge on the print medium at least once after the pass separation processing is hatched. In this embodiment, single-layer printing of an image is executed by discharging the color inks and the white ink at the same discharge timing. Therefore, the orifices of the coloring material inks (C, M, Y, and K) and the reactive liquid (RCT_C) for printing the color development region and the orifices of the coloring material ink (W) and the reactive liquid (RCT_W) for printing the concealed region may be arranged side by side. In this embodiment, to decrease the surface smoothness of the white ink, the pass separation processing is executed so that the number of orifices for discharging the ink and the reactive liquid in the orifice array (22W) of the white ink and the orifice array (22RCT_W) of the reactive liquid corresponding to the white ink is larger than the number of orifices for discharging the inks and the reactive liquid in other orifice arrays. More specifically, the CPU 301 executes the pass separation processing so that the orifice arrays (22K, 22C, 22M, 22Y, and 22RCT_C) for printing the color development region discharge the inks and the reactive liquid by orifices the number of which is a half of the total number of orifices. On the other hand, the CPU 301 executes the pass separation processing so that the orifice arrays (22W and 22RCT_W) for printing the concealed region discharge the ink and the reactive liquid by all the orifices. Thus, in this embodiment, if, for example, an image is printed in 16 passes, processing of completing printing of the color development region in eight passes and completing printing of the concealed region in 16 passes is implemented. As the number of passes is smaller, the surface smoothness is higher, and as the number of passes is larger, the surface smoothness is lower.

Finally, in step S606, the CPU 301 prints an image on the print medium based on the data having undergone pass separation. Then, this processing ends.

In this embodiment, multi-valued data of the respective inks and the respective reactive liquids are generated so as to execute printing in the color development region with the color inks and the reactive liquid with low reactivity and execute printing in the concealed region with the white ink and the reactive liquid with high reactivity in the color separation processing. Thus, according to this embodiment, it is possible to control the surface smoothness for the color inks and the white ink. As a result, according to this embodiment, it is possible to decrease the surface smoothness of the white ink in the concealed region while improving the color developability by improving the surface smoothness of the color inks in the color development region, thereby improving concealability.

In this embodiment, orifices for printing the color development region and orifices for printing the concealed region in the pass separation processing are assigned, and passes are set to discharge the reactive liquid at a discharge timing such that the coloring material of each of the color inks and the white ink can be aggregated. According to this embodiment, by these settings, it is possible to further improve the color developability by improving the surface smoothness of the color inks in the color development region and to further improve the concealability by decreasing the surface smoothness of the white ink in the concealed region.

Second Embodiment

In this embodiment, components different from the first embodiment will be described. The same reference numerals as in the first embodiment denote the same components and a detailed description thereof will be omitted. Only different parts will be described in detail.

Figure 9:
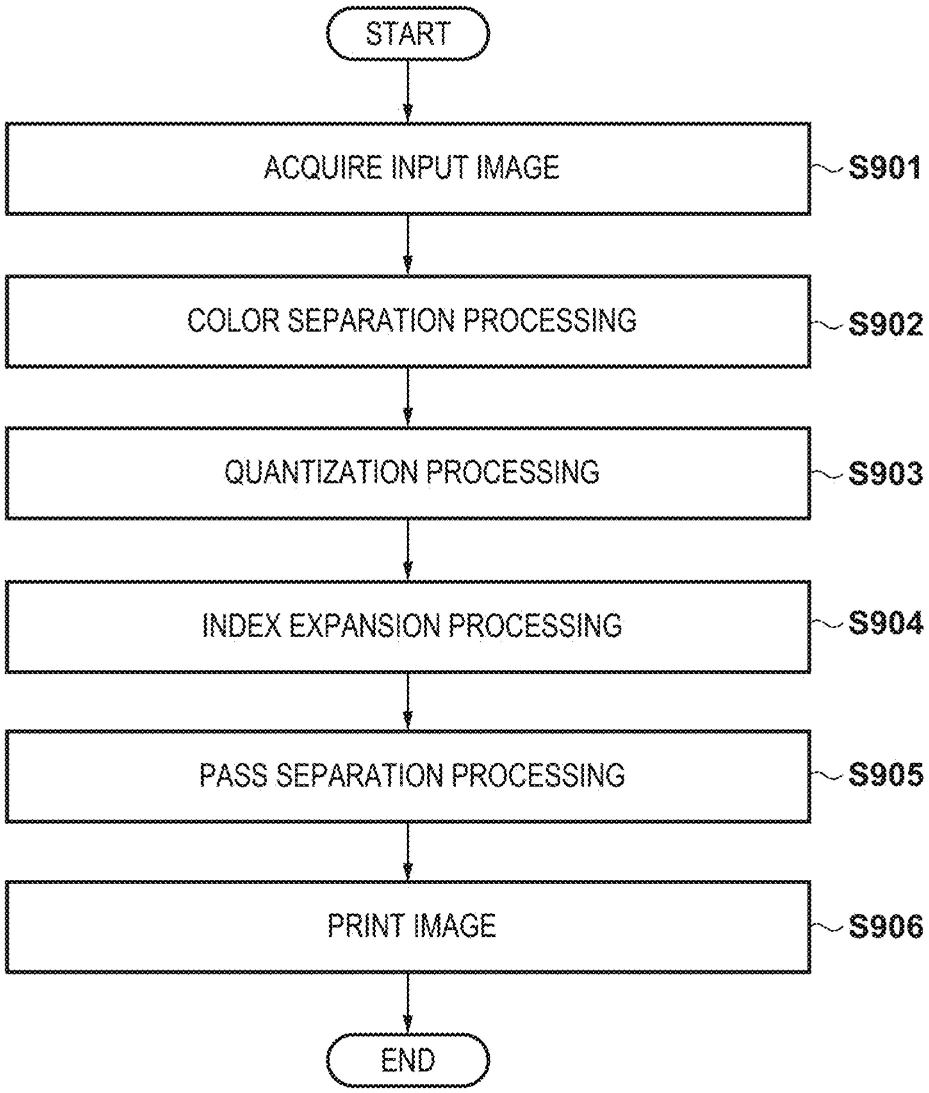
FIG. 9 is a flowchart for explaining image processing according to the second embodiment.

FIG. 9 is a flowchart for explaining image processing for executing multilayer printing in which color inks are printed on white ink. The first embodiment has explained single-layer printing in which the color inks and the white ink are printed in exclusive regions. This embodiment will describe multilayer printing in which the white ink and the color inks are superimposed and printed in the same region.

In step S901 shown in FIG. 9, a CPU 301 acquires data of an input image, and stores it in a storage device 313 or the like. The input image is desirably an RGB+W image, a CMYK+W image, or the like obtained by adding an image (W image) for white representing a concealed region to an image in a general format such as an RGB image or a CMYK image representing a color development region. Alternatively, the CPU 301 may acquire, as an input image, an image in a general format such as an RGB image or a CMYK image representing a color development region. In this case, the CPU 301 may generate, from the input image, an image including a concealed region by converting signal values (R, G, B)+(255, 255, 255) or (C, M, Y, K)/(0, 0, 0, 0) representing a region other than a white region into the concealed region, and store the image as a new input image.

In step S902, the CPU 301 executes, for the input image including the concealed region acquired in step S901, color separation processing for generating color separation data as data of a printing image including multi-valued data of the respective inks and respective reactive liquids. More specifically, the CPU 301 generates, from data representing the color development region of the input image, multi-valued data of coloring material inks (C, M, Y, and K) to be used for printing and multi-valued data of a reactive liquid (RCT_C). The CPU 301 generates, from data representing the concealed region of the input image, multi-valued data of coloring material ink (W) to be used for printing and multi-valued data of a reactive liquid (RCT_W). As a method of converting the signal values of the input image, a known method such as a method of referring to a lookup table (LUT) stored in advance in a ROM 302 or the like may be adopted. The CPU 301 mainly uses the white ink for printing for the concealed region of the input image but may execute color separation processing of applying another color ink for the purpose of adjusting white. For the purpose of further improving concealability, the CPU 301 may apply such multilayer mode that the concealed region is formed by three layers of white, black, and white. In a case where another color ink is used for printing for the concealed region, a reactive liquid to be printed is the same reactive liquid (RCT_W) as for the white ink. Even for the same color ink, the reactive liquids (RCT_C and RCT_W) are selectively used in accordance with the color development region or the concealed region. When performing color separation processing, the balance between the amount of the coloring material ink and the amount of the reactive liquid is important. If the amount of the reactive liquid is small with respect to the coloring material ink, the coloring material is not sufficiently aggregated, thereby causing beading. If the amount of the reactive liquid is large with respect to the coloring material ink, a moisture content in the reactive liquid increases, thereby causing beading. Therefore, in the color separation processing, the CPU 301 desirably balances an appropriate ink amount with each of the color development region and the concealed region of the image in order to implement excellent image formation.

In step S903, the CPU 301 executes quantization processing of converting each of the multi-valued data of the coloring material inks and the multi-valued data of the reactive liquids after the color separation processing into quantization data of several bits. When, for example, quantizing the multi-valued data into 4-valued data, the CPU 301 converts tone data into 2-bit data of levels 0 to 3. As the method of the quantization processing, there are known the error diffusion method and the dither method, but any method may be used.

In step S904, the CPU 301 executes index expansion processing based on the quantized data of the coloring material inks and the quantized data of the reactive liquids. More specifically, the CPU 301 selects, in association with the level obtained in step S903, one dot arrangement pattern from a plurality of dot arrangement patterns for defining the number of dots to be printed in each pixel. At this time, as the form of the dot arrangement pattern, the number of dots to be printed in a region corresponding to each pixel is desirably made different depending on the level value. To improve the surface smoothness of the color ink among the coloring material inks, the CPU 301 sets the number of dots of the color ink to 0, 1, 2, or 3 to minimize a difference in number of dots between the levels. On the other hand, the CPU 301 sets the number of dots of the white ink to 0, 1, 3, or 5 to intentionally increase a difference in number of dots between the levels. Thus, when printing a uniform density on the print medium, 3 dots or 5 dots are printed in a region corresponding to each pixel, thereby making it possible to execute printing that decreases the surface smoothness by increasing a difference in number of dots.

In step S905, the CPU 301 performs pass separation processing of assigning, to the coloring material ink data and the reactive liquid data as the dot data obtained by performing the index expansion processing, orifices to be used for printing, by a pass mask. Unlike the first embodiment, since multilayer printing in which the white ink and the color inks are superimposed and printed in the same region is performed, the pass mask for performing the pass separation processing of the color inks and the reactive liquid corresponding to the color inks is assumed to be a pass mask in which upper 960 squares of 1,280 squares do not perform discharge. In this embodiment, the CPU 301 sets a pass mask in which lower 320 squares of 1,280 squares in each of the orifice arrays for the white ink and the reactive liquid corresponding to the white ink do not perform discharge.

Figure 10:
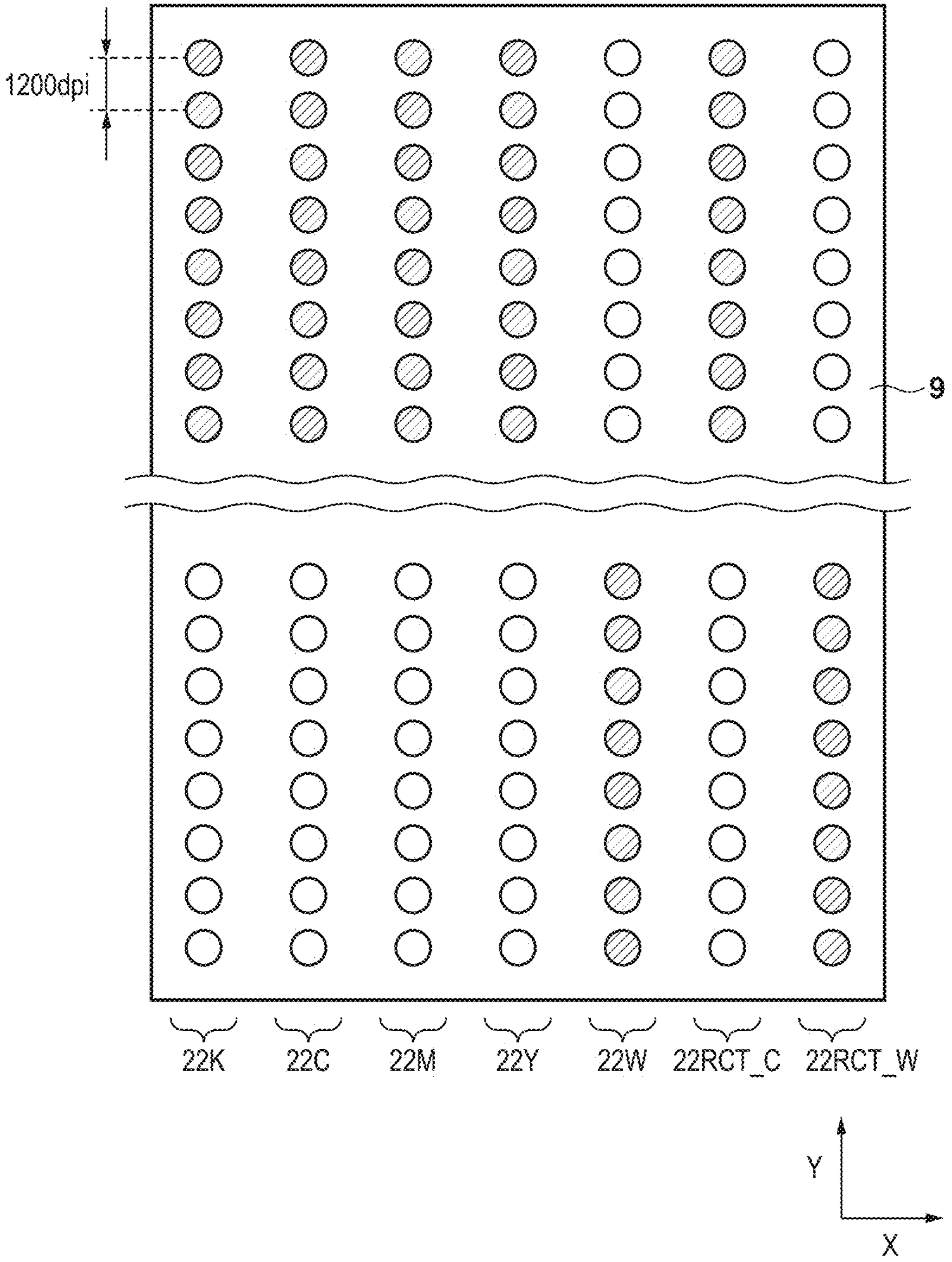
FIG. 10 is a view of a printhead in which an orifice that performs discharge after pass separation processing is hatched according to the second embodiment.

In a view shown in FIG. 10, an orifice that executes printing on the print medium at least once after the pass separation processing is hatched. In this embodiment, multilayer printing of an image is executed by discharging the color inks on the white ink. The orifices of the coloring material inks (C, M, Y, and K) and the reactive liquid (RCT_C) for printing the color development region and the orifices of the coloring material ink (W) and the reactive liquid (RCT_W) for printing the concealed region are vertically separated, as shown in FIG. 10. Furthermore, in this embodiment, to decrease the surface smoothness of the white ink, the CPU 301 executes the pass separation processing so that the number of orifices for discharging the ink in the orifice array (22W) of the white ink and the orifice array (22RCT_W) of the reactive liquid corresponding to the white ink is larger than the number of orifices for discharging the inks in other orifice arrays. Thus, in this embodiment, when printing an image, the number of passes of the orifices for discharging the white ink and the reactive liquid is set larger than the number of passes for other inks. More specifically, the CPU 301 executes the pass separation processing so that the orifice arrays (22K, 22C, 22M, 22Y, and 22RCT_C) for printing the color development region discharge the inks and the reactive liquid by orifices the number of which is ¼ of the total number of orifices. On the other hand, the CPU 301 executes the pass separation processing so that the orifice arrays (22W and 22RCT_W) for printing the concealed region discharge the ink and the reactive liquid by orifices the number of which is ¾ of the total number of orifices. Thus, in this embodiment, if, for example, an image is printed in 32 passes, processing of printing the color development region in eight passes after printing the concealed region in 24 passes can be performed. As the number of passes is smaller, the surface smoothness is higher, and as the number of passes is larger, the surface smoothness is lower.

Finally, in step S906, the CPU 301 prints an image on the print medium based on the data having undergone pass separation. Then, this processing ends.

In this embodiment, multi-valued data of the respective inks and the respective reactive liquids are generated so as to execute printing in the color development region with the color inks and the reactive liquid with low reactivity and execute printing in the concealed region with the white ink and the reactive liquid with high reactivity in the color separation processing. Thus, according to this embodiment, it is possible to control the surface smoothness for the color inks and the white ink. As a result, according to this embodiment, it is possible to decrease the surface smoothness of the white ink in the concealed region while improving the color developability by improving the surface smoothness of the color inks in the color development region, thereby improving concealability.

In this embodiment, orifices for printing the color development region and orifices for printing the concealed region in the pass separation processing are assigned, and passes are set to discharge the reactive liquid at a discharge timing such that the coloring material of each of the color inks and the white ink can be aggregated. According to this embodiment, by these settings, it is possible to further improve the color developability by improving the surface smoothness of the color inks in the color development region and to further improve the concealability by decreasing the surface smoothness of the white ink in the concealed region.

Other Embodiments

Various embodiments of the present invention have been explained above. However, the present invention is not limited to these embodiments, and other embodiments can be incorporated in the scope of the present invention as long as the same effect as the present invention is obtained.

For example, even if the above-described embodiments are applied to an embodiment for concealment by metallic ink such as silver ink or gold ink instead of the white ink, the same effect is obtained. Furthermore, the above-described embodiments can be used to control the gloss for any purpose other than the purpose of improving concealability as long as the purpose is to change the surface smoothness. For example, the above-described embodiments can be used to express a matte texture by decreasing the surface smoothness or to express a glossy texture by improving the surface smoothness.

Figure 11:
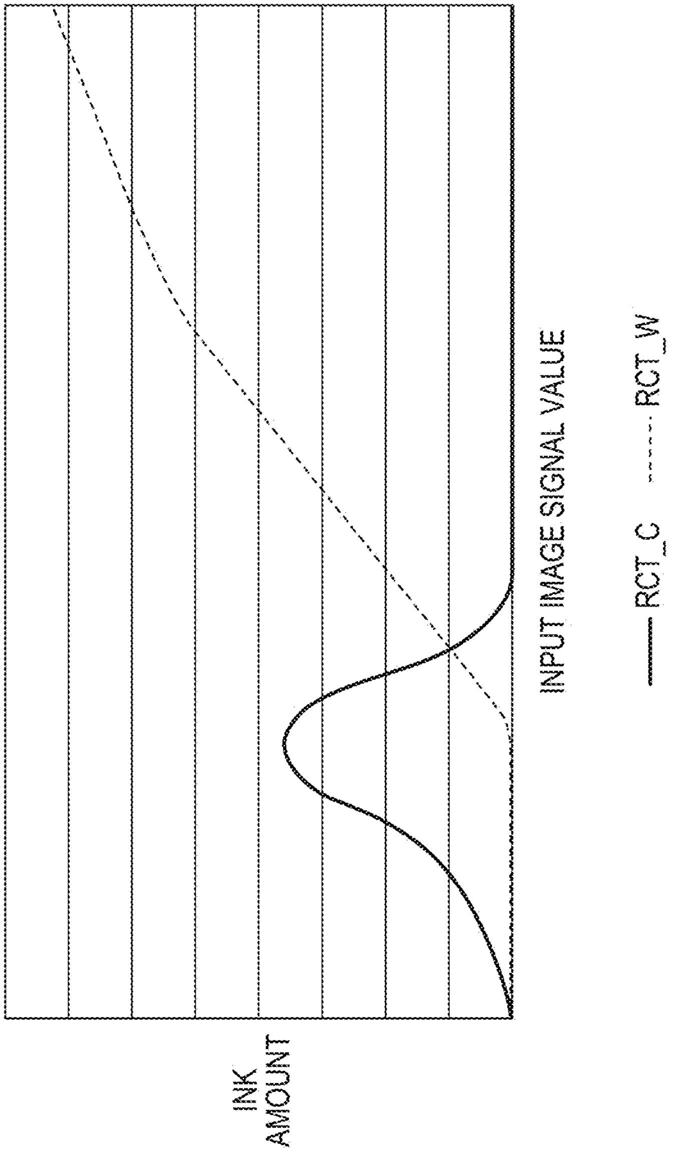
FIG. 11 is a graph showing an example of color separation processing for an image representing a concealed region according to other embodiments.

In each of the above-described embodiments, printing is executed by combining the coloring material inks and the reactive liquids. However, the present invention may be applied to an embodiment in which not only a reactive liquid with high reactivity with white ink but also a reactive liquid with low reactivity is used for an image representing a concealed region. With respect to the signal values of an input image in which less than 1 dot of white ink is printed on the print medium, it is possible to improve concealability by focusing on not surface smoothness but surface coverage. FIG. 11 is a graph showing an example of color separation processing for an image representing a concealed region according to other embodiments. As shown in FIG. 11, it is possible to further improve concealability by performing color separation processing so as to use a reactive liquid with low reactivity in a region where the signal values of an input image are small and a reactive liquid with high reactivity in a region where the signal values of the input image are large.

In each of the above-described embodiments, with respect to a pass mask used for pass separation processing, the numbers of passes of the coloring material inks and the reactive liquids are made equal to each other. However, the reactive liquid may be discharged first. For example, the CPU 301 may execute pass separation processing using such pass mask that the number of passes for the color inks of the color development region is seven, the number of passes for the reactive liquid with low reactivity is eight, the number of passes for the white ink of the concealed region is 15, and the number of passes for the reactive liquid with high reactivity is 16.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-156526, filed Sep. 21, 2023, which is hereby incorporated by reference herein in its entirety.

What is claimed is:

1. An image processing apparatus comprising:

an acquisition unit configured to acquire data of an image; and a generation unit configured to generate color separation data as data of a printing image including a first region and a second region based on the data of the image, wherein the generation unit generates the color separation data including:

first data for discharging, to the first region, a first ink and a first reactive liquid that reacts with the first ink, and second data for discharging, to the second region, a second ink and a second reactive liquid that has reactivity higher than reactivity of the first reactive liquid and reacts with the second ink.

2. The apparatus according to claim 1, wherein
the first region is a color development region,
the second region is a concealed region,
the first ink is color development ink, and
the second ink is concealing ink.

3. The apparatus according to claim 2, wherein
each of the first ink and the second ink contains a coloring material, and
each of the first reactive liquid and the second reactive liquid contains no coloring material.

4. The apparatus according to claim 1, further comprising a pass separation processing unit configured to execute pass separation processing of setting orifices for discharging the first ink, the second ink, the first reactive liquid, and the second reactive liquid.

5. The apparatus according to claim 4, wherein the pass separation processing unit
sets a discharge timing of the first ink and the first reactive liquid and a discharge timing of the second ink and the second reactive liquid to be close to each other in the pass separation processing, and
sets the number of passes for performing discharge to be greater for the second ink and the second reactive liquid.

6. The apparatus according to claim 4, further comprising an index expansion processing unit configured to execute index expansion processing of selecting a pattern from dot arrangement patterns for defining the number of dots to be printed in each pixel of the image based on the color separation data of the first ink, the second ink, the first reactive liquid, and the second reactive liquid before the pass separation processing,
wherein the index expansion processing unit sets a difference in number of dots of a dot arrangement pattern of the second ink to be greater than a difference in number of dots of a dot arrangement pattern of the first ink.

7. The apparatus according to claim 1, wherein the generation unit sets, for signal values of the first region of the image, an amount of the first ink and an amount of the first reactive liquid corresponding to the amount of the first ink.

8. The apparatus according to claim 1, wherein the generation unit generates the color separation data so that surface smoothness of the second region is lower than surface smoothness of the first region.

9. The apparatus according to claim 1, wherein the generation unit:
sets to use a reactive liquid with low reactivity as the second reactive liquid in a case where an amount of the second ink is smaller than a predetermined amount, and
sets to use a reactive liquid with high reactivity as the second reactive liquid in a case where the amount of the second ink is larger than the predetermined amount.

10. The apparatus according to claim 1, wherein the generation unit:
sets to use color ink as the first ink, and
sets to use at least white ink as the second ink.

11. A printing apparatus comprising:
a print unit configured to print, on a print medium, a first ink and a second ink each containing a coloring material and a first reactive liquid and a second reactive liquid each containing no coloring material,
wherein the first reactive liquid is printed in a region where the first ink is printed, and
the second reactive liquid with reactivity higher than reactivity of the first reactive liquid is printed in a region where the second ink is printed.

12. An image processing method comprising:
acquiring data of an image; and
generating color separation data as data of a printing image including a first region and a second region based on the data of the image,
wherein in the generating the color separation data, the color separation data including first data for discharging, to the first region, a first ink and a first reactive liquid that reacts with the first ink, and second data for discharging, to the second region, a second ink and a second reactive liquid that has reactivity higher than reactivity of the first reactive liquid and reacts with the second ink is generated.

13. A non-transitory computer-readable storage medium storing a computer program for causing, when loaded and executed by a computer, the computer to:
acquire data of an image; and
generate color separation data as data of a printing image including a first region and a second region based on the data of the image,
wherein in the generating the color separation data, the color separation data including first data for discharging, to the first region, a first ink and a first reactive liquid that reacts with the first ink, and second data for discharging, to the second region, a second ink and a second reactive liquid that has reactivity higher than reactivity of the first reactive liquid and reacts with the second ink is generated.

* * * * *